INVENTOR
Alfons Steppuhn

United States Patent Office 3,347,034
Patented Oct. 17, 1967

3,347,034
RAPID CABLE MAKING MACHINE
Alfons Steppuhn, Klaus-Groth-Str. 15,
Bad Oldesloe, Germany
Filed Apr. 14, 1965, Ser. No. 448,092
Claims priority, application Germany, June 30, 1964,
St 22,330
10 Claims. (Cl. 57—58.36)

ABSTRACT OF THE DISCLOSURE

A wire twisting cable machine having a plurality of aligned spools and wire guide supports outwardly of the spools is provided with bearings for the spools of such diameter that wire coming from preceding spools is passed over following spools without being severely bent.

Figure 1:
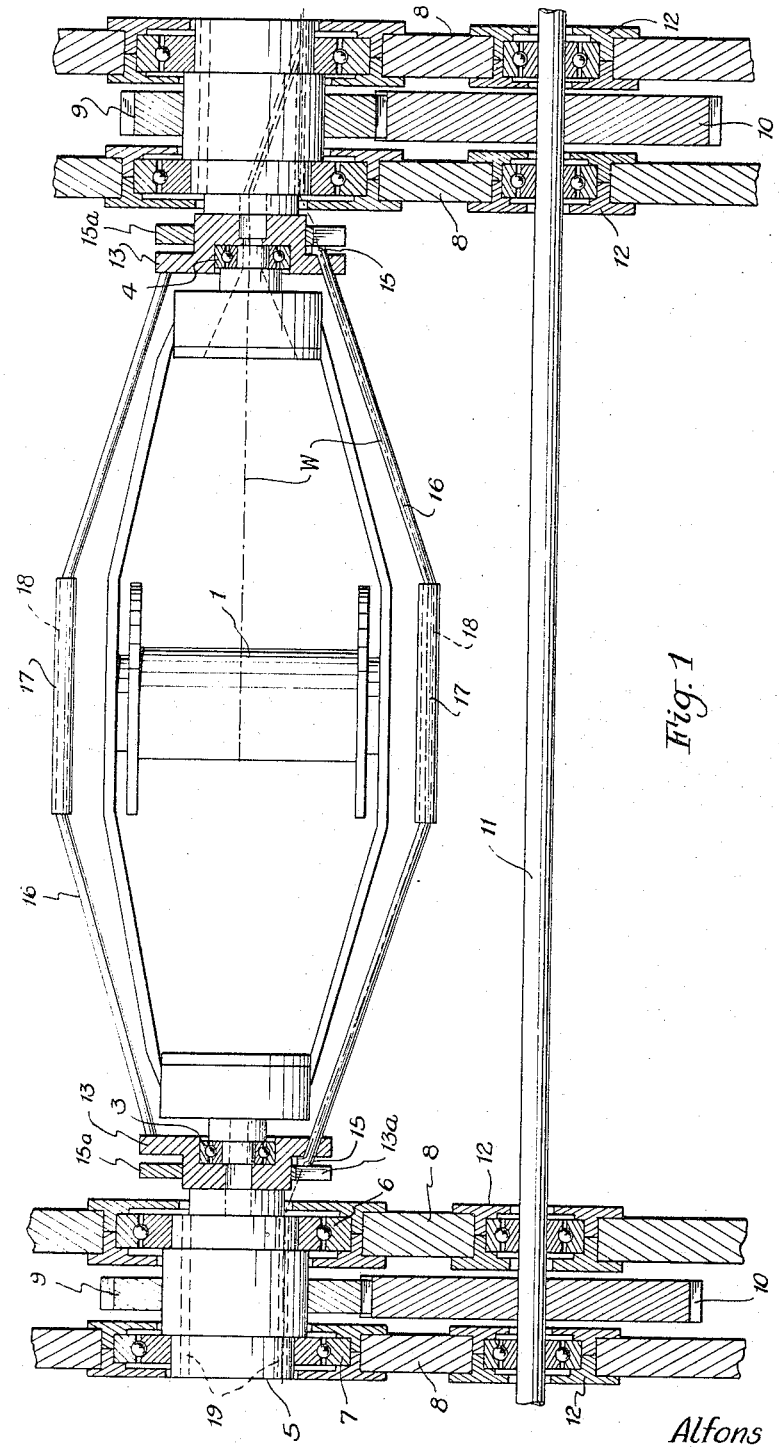

This invention relates to a cable making machine and, in particular, to a rapidly running machine for twisting wires into a cable or rope.

The cable making machines now used are composed of a relatively long pipe in which the spools or reels of wire are mounted along the longitudinal axis of the pipe. Openings in the pipe are provided for installing and removing the spools. The wires unrolling from the spools are guided along the outside of the pipe to the twisting and closing mechanism. These machines have a disadvantage in that the pipe constitutes a relatively large mass which must be rapidly rotated. Therefore, the pipe must have a thick, strong and heavy wall in order to operate. Also, large and strong roller bearings are needed to support the weight of the pipe at one or more points along its length. Consequently, the heavy and clumsy apparatus has the further disadvantage that the deceleration of the machine, as would be required when a wire broke, or the like requires a high expenditure of energy over a relatively long period of time. Also, in the same manner, the acceleration of the machine requires a high energy output. Again, the wear and tear is relatively high in view of the heavy rotating mass.

The pipe is also a relatively long rigid body which requires that the roller bearings must be accurately positioned in order to avoid heavy wear and tear on the bearings which would result in damages and shutdowns. The pipe must be exactly balanced along its entire length. The bearings require a very strong base. The use of the machine is restricted to its entire length. The pipe makes it difficult to observe the setting up of the machine and its operation. Special drives are needed to rotate the pipe because of the relatively high acceleration to operating speed.

The object of this invention is to produce a rapidly running wire twisting machine which will avoid the above disadvantages of the known cable making machines. In general, this invention relates to a rapid wire twisting machine having several spools lying along the longitudinal axis of the machine. In this invention, individual wire supports are used to guide the unrolling wires coming from preceding spools outwardly and past the frames of the following spools. These guide wire supports are secured to bearing means which form a connecting device for adjacent spool frames. An advantage of this invention is that the part of the machine having a spool and wire guide supports requires only wire guide supports and fastening means for the same so that the mass of the rapidly rotating body is considerably diminished. Thus, in this invention, the mass of the rotating body is only a small part of the mass of the heretofore used pipe wire twisting machines. Thus the machine of this invention does not need a heavy foundation in order to properly position the machine and it is not subjected to as much wear and tear. It is comparatively easy to decelerate the machine should a wire break, and the machine is easily accelerated without a great expenditure of energy. This means that a lighter and more simple brake can be used. Also, the drive does not need a special construction for accelerating the machine. The small machines, according to this invention, can be driven by a drive shaft connected directly with a motor. Another advantage of the machine of this invention is that it is relatively flexible along its entire length so that the base for the machine can be simplified without the use of heavy foundations for the bearings. As the machine is of open construction, it is easy to observe its entire length during both set up and operation. Finally, a further advantage is in that the machine can be lengthened or shortened for the manufacture of standardized cables inasmuch as the wire guide supports and the fastening means can be added or removed from the machine.

Figure 2:
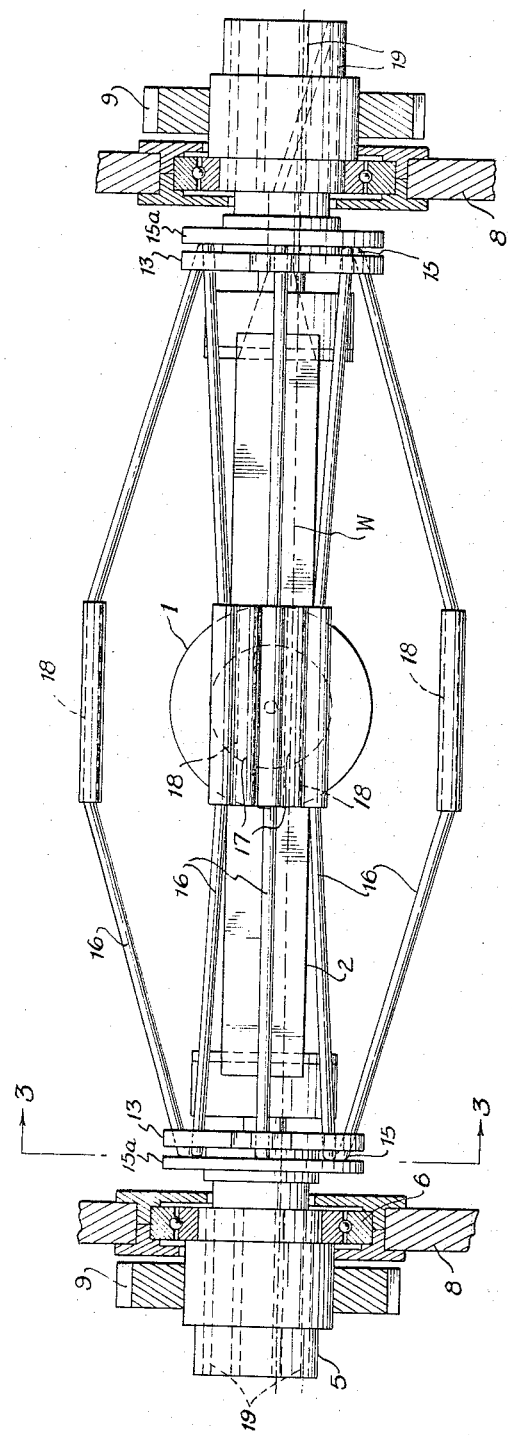
Figure 3:
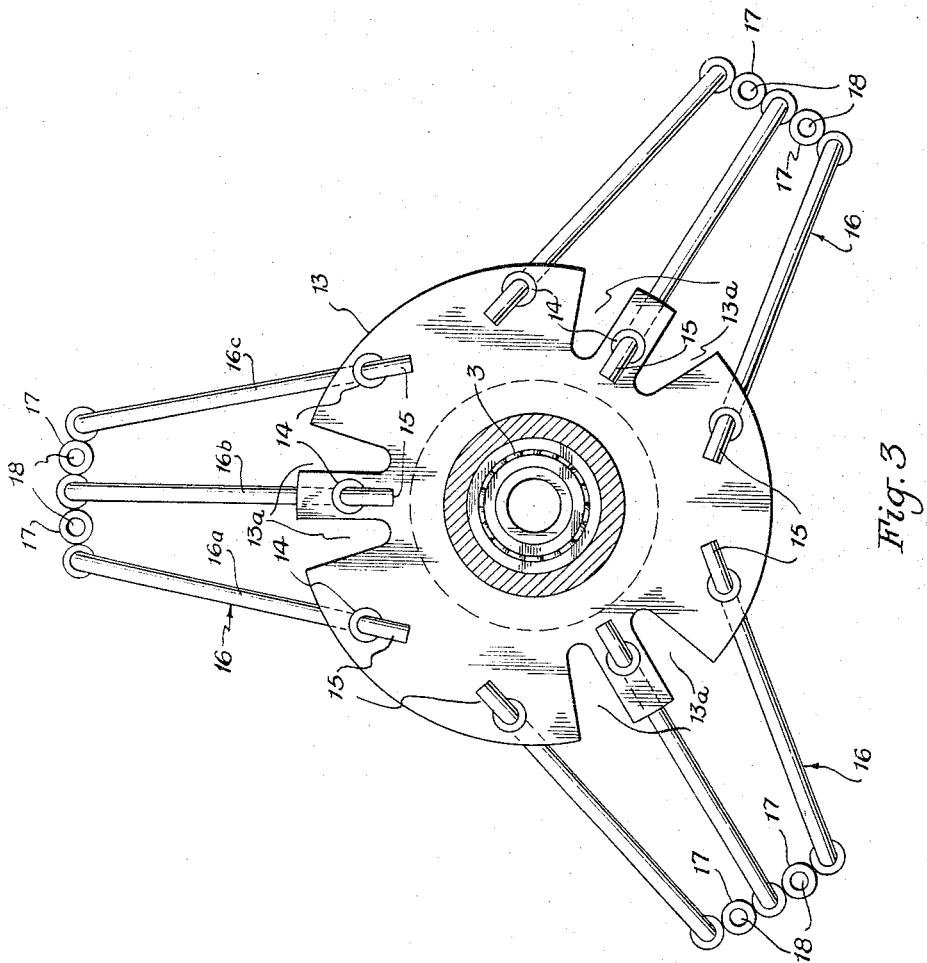
Figure 4:
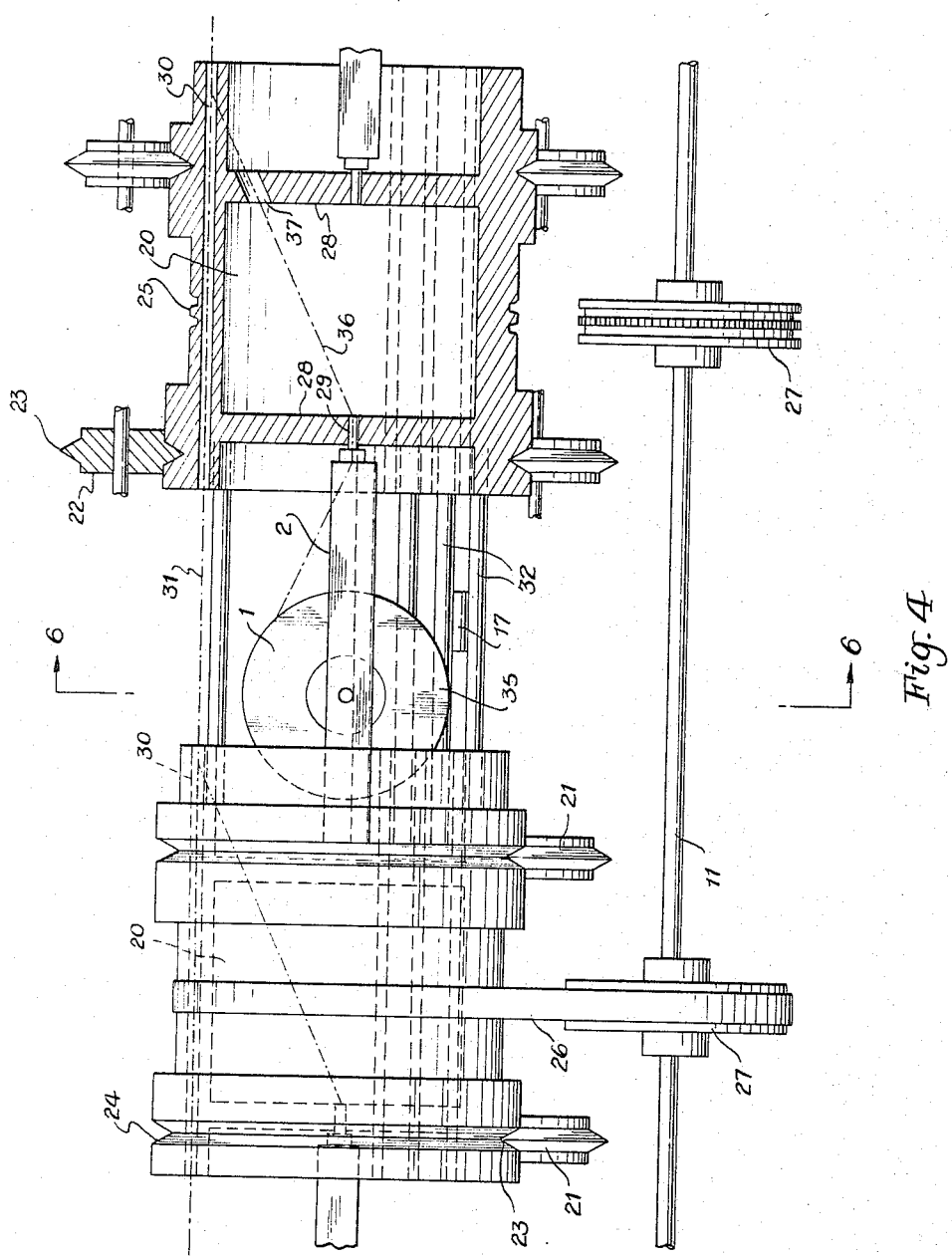
Figure 5:
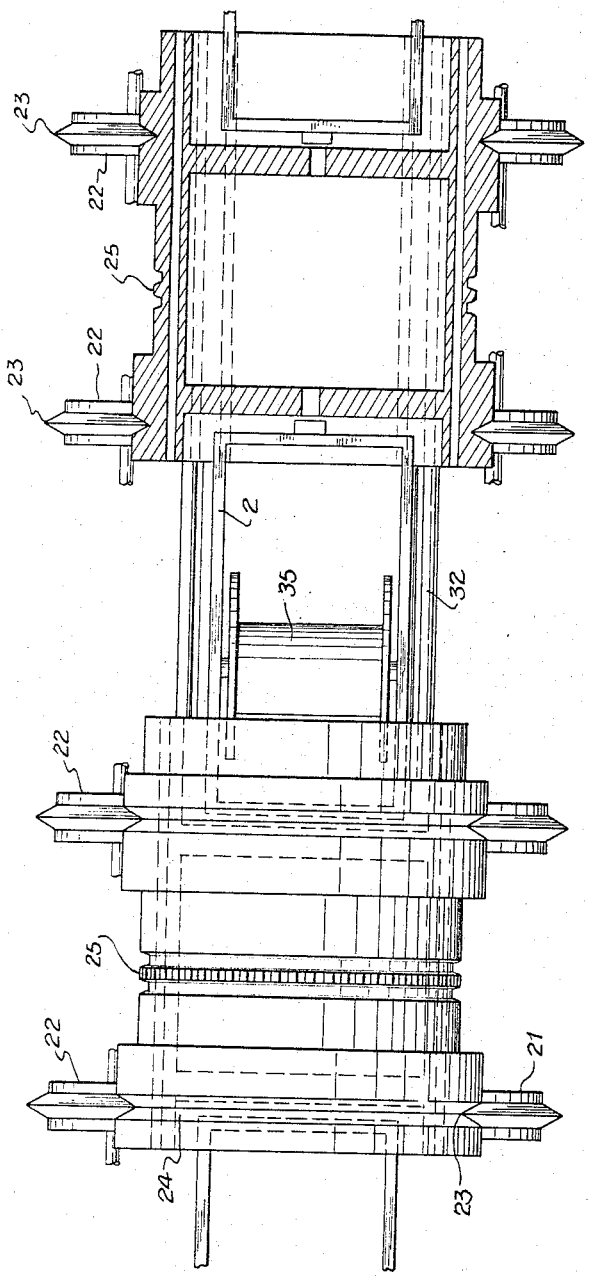
Figure 6:
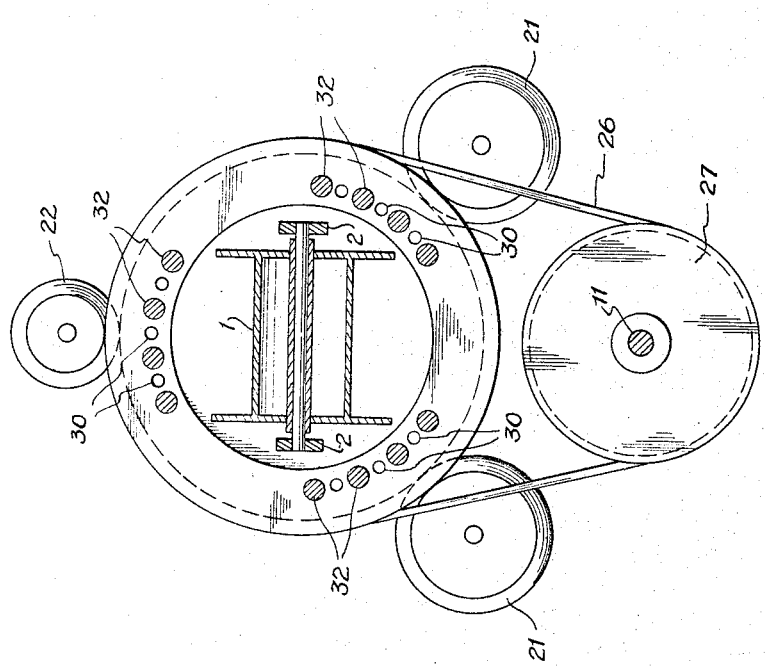

The means by which the objects of the invention are obtained are described more fully with reference to the accompanying drawings in which:

FIGURE 1 is a partial plan view of a portion of the wire twisting machine;
FIGURE 2 is a front view of a portion of FIGURE 1;
FIGURE 3 is a cross-sectional view taken along the line 3—3 of FIGURE 2;
FIGURE 4 is a front elevational view of a modification of FIGURE 1;
FIGURE 5 is a partial plan view of FIGURE 4; and
FIGURE 6 is a cross-sectional view taken on the line 6—6 of FIGURE 4.

The drawings show only a part of the elongated wire twisting machine, which part contains a single spool mounted in the machine stand, together with the drive for the spool and the wire guide supports mounted outwardly of the frame for the spool.

In FIGURES 1, 2 and 3, for simplicity, an empty wire spool 1 is illustrated. This spool is mounted in a spool frame 2 in a conventional manner. Frame 2 is journalled in bearings 3 and 4 mounted in a bearing means composed of short shafts 5 which constitute both a fastening means for the wire guide supports and a means for connecting adjacent spool frames to each other.

The bearing means composed of shafts 5 are journalled in roller bearings 6 and 7 mounted in the stand 8 for the machine. A pinion 9 is attached to each shaft and is engaged by a pinion 10 secured to a drive shaft 11 which is journalled in roller bearings 12 mounted in stand 8. Shaft 11 can be connected directly to a drive motor. Thus intermediate reduction gears or special starting gears are eliminated because of the small mass which has to be rotated.

Discs 13 are attached to each end of each shaft 5. In FIGURES 1 to 3, only one disc is illustrated on one end of each shaft. A plurality of bores 14 are formed symmetrically adjacent the circumference of disc 13. The ends 15 of wire guide support rods 16 are pushed through each bore 14, respectively. These ends 15 are then bent and then firmly secured against disc 13 by means of a clamping annular plate 15a. Plate 15a can be clamped by any suitable means, such as by bolts, not shown.

In FIGURE 3, it is shown that nine rods 16 can be secured to disc 13, and these rods are arranged in groups of three, rods 16a, 16b and 16c. These rods extend from a disc 13 outwardly of frame 2 and to an opposite disc 13 and appear somewhat as a cage surrounding frame 2. In mid-length, the rods 16 of each group are drawn toward one another and in between each pair of adjacent rods are fastened, as by welding, hollow tubes 17 through which the wires W coming from a preceding spool are to be guided and supported outwardly of a following spool as the wires are drawn to the twisting device. Therefore, as shown in FIGURE 3, six wires can be drawn through the hollow interiors 18 of the six tubes 17. However, it is possible to use any number of supporting rods 16 arranged in different groupings.

In this invention, a very simple and practically without mass framing for the spools 1 and their frames 2 can be provided for controlling the unwinding of the wires. Shafts 5 are provided with bores 19 which correspond in number to the number of wires that are to be twisted. The position of each bore 19 is in between each pair of adjacent rods 16 so that the wires can be led to the tubes 17.

The periphery of disc 13 contains slots 13a through which the wires pass by disc 13. The wire W, only one being shown for purposes of simplicity, are thus strung in a circle around frame 2 and through the wire guide support tubes 17. Likewise the wires are formed in a circle around shaft 5 in order to pass through the bores 19. Slight bends in the wire do not influence the stability of the wires or the twisting of the wires into a cable.

If for any special reason the unwinding wires are to be bent as little as possible, as would occur in long machines, then the diameter of shaft 5 can be correspondingly enlarged. The wire guide support rods 16 thus would become correspondingly straighter.

When shafts of large diameter are used, it is possible that the bores 19 are located so that the wires can be moved through the machine practically without bending.

As shown in the modification of FIGURES 4, 5 and 6, cylindrical casings 20 replace shafts 5. These casings are held on two support rollers 21 and by counter rollers 22. Rollers 21 and 22 have V-shaped running edges 23 which ride in complementary grooves 24 in casings 20. This is to prevent longitudinal shifting of the casings which would cause disengagement with the rollers 21 and 22. Gear teeth 25 are formed on the circumference of casings 20, which teeth are engaged by a toothed belt 26 driven by a sprocket 27 secured to drive shaft 11.

Struts 28 extend across the interior of casings 20 for supporting the bearings 29 for the frame 2 holding spool 1.

Bores 30 through casings 20 are for the passage of wires 31 coming from a preceding spool.

Adjacent casings 20 are connected to each other by rods 32 positioned parallel to the longitudinal axis of the machine. These rods 32 also can be in any other desired direction. These rods 32 together with tubes 17 fastened between pairs of adjacent rods constitute a wire guide support means for leading each individual wire coming from a preceding spool outwardly of a following spool frame 2 onto a following casing 20.

Wire 36 coming from spool 35, FIGURE 4, goes through a corresponding opening 37 in strut 28 and then into a bore 30.

Depending upon the size of the machine, either all of the shafts 5 or the casings 20 can be driven or only a portion of them. For example, only every second, third or fourth, and so forth, can be driven. In a short and light machine, it is possible to drive only one of the members. The number of driven members depends upon the resistance given by the wire supporting elements, such as the bores and the wire guide supports.

Having now described the means by which the objects of the invention are obtained, I claim:

1. In a rapid wire twisting machine for making a cable comprising a plurality of spools aligned along the longitudinal axis of the machine, and frame means for turning the spools at right angles to the direction wire is unwound from the spools, the improvement comprising wire guide support means positioned outwardly of and around said spools for guiding wires coming from preceding spools and passed following spools, and bearing means for holding said frame means and for holding said support means for passing said wire in a substantially straight line outwardly of said frame means.

2. In a machine as in claim 1, further comprising drive shaft means parallel to the longitudinal axis of said machine for rotating at least one of said bearing means.

3. In a machine as in claim 2, said rods being arranged in a plurality of groups.

4. In a machine as in claim 3, each wire guide being fastened between a pair of adjacent rods.

5. In a machine as in claim 4, said drive shaft means comprising a drive shaft, a sprocket mounted on said shaft, sprocket teeth on said bearing means, and a sprocket belt joining said sprocket and said teeth on said bearing means.

6. In a machine as in claim 5, said bearing means having a diameter greater than that of said frame means.

7. In a machine as in claim 6, further comprising supporting rollers for said bearing means, and counter rollers for holding said bearing means on said support rollers.

8. In a machine as in claim 7, said rollers having running edges V-shaped in cross-section riding in complementary grooves in said bearing means.

9. In a machine as in claim 8, further comprising bores through said bearing means for the passage of wires coming from said spools.

10. In a machine as in claim 9, said bores being positioned alternately between said rods.

References Cited

UNITED STATES PATENTS

| | | | |
|---|---|---|---|
| 443,491 | 12/1890 | Ball | 57—58.30 XR |
| 555,146 | 2/1896 | Barrett | 57—58.36 |
| 2,371,523 | 3/1945 | Jones | 57—58.34 |
| 2,457,402 | 12/1948 | Roetting | 57—58.36 |
| 2,534,696 | 12/1950 | Bruestle | 57—58.3 XR |
| 2,633,692 | 4/1953 | MacCreadie. | |
| 2,841,514 | 7/1958 | Nordblad | 57—58.3 XR |
| 2,877,620 | 3/1959 | Blaisdell | 57—58.34 |
| 2,897,646 | 8/1959 | Simcoe et al. | 57—58.3 |
| 2,921,428 | 1/1960 | Lutcke et al. | 57—58.3 |
| 3,000,169 | 9/1961 | Rishaud | 57—58.34 |
| 3,095,686 | 7/1963 | Steinlein | 57—58.3 |
| 3,258,905 | 7/1966 | Carter | 57—58.34 |

FRANK J. COHEN, *Primary Examiner.*

D. E. WATKINS, *Assistant Examiner.*